United States Patent
Shen

(10) Patent No.: US 6,421,471 B2
(45) Date of Patent: Jul. 16, 2002

(54) OPTICAL RECIRCULATION DEPOLARIZER AND METHOD OF DEPOLARIZING LIGHT

(75) Inventor: Pai-Sheng Shen, Fremont, CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 09/814,008

(22) Filed: Mar. 20, 2001

Related U.S. Application Data

(62) Division of application No. 09/366,158, filed on Aug. 3, 1999, now Pat. No. 6,205,262, which is a division of application No. 08/847,177, filed on May 1, 1997, now Pat. No. 5,933,555.

(51) Int. Cl.$^7$ ............... G02B 6/00; G01B 9/02
(52) U.S. Cl. ............... 385/11; 385/32; 385/37; 385/24; 356/350
(58) Field of Search ............ 385/11, 37, 123, 385/32, 24; 356/345, 350

(56) References Cited

U.S. PATENT DOCUMENTS

| | | | | |
|---|---|---|---|---|
| 5,075,893 A | * | 12/1991 | Epstein et al. ............ 372/108 |
| 5,218,652 A | * | 6/1993 | Lutz ............ 385/11 |
| 5,245,407 A | * | 9/1993 | Nishiura et al. ............ 356/350 |
| 5,293,264 A | * | 3/1994 | van Deventer ............ 359/192 |
| 5,408,545 A | * | 4/1995 | Lee et al. ............ 385/11 |
| 5,457,756 A | * | 10/1995 | Hartl et al. ............ 385/11 |
| 5,486,916 A | * | 1/1996 | Michal et al. ............ 356/345 |
| 5,636,021 A | * | 6/1997 | Udd ............ 356/345 |
| 5,644,397 A | * | 7/1997 | Blake ............ 356/345 |
| 5,933,555 A | * | 8/1999 | Shen ............ 385/32 |
| 6,195,162 B1 | * | 2/2001 | Varnham et al. ............ 356/345 |
| 6,205,262 B1 | * | 3/2001 | Shen ............ 385/11 |
| 6,211,964 B1 | * | 4/2001 | Luscombe et al. ............ 356/477 |
| 6,317,548 B1 | * | 11/2001 | Rockwell et al. ............ 385/123 |

* cited by examiner

Primary Examiner—Brian Healy
(74) Attorney, Agent, or Firm—Wei Te Chung

(57) ABSTRACT

An optical depolarizer and method of depolarizing light is described. An input light beam is split into two beams. One split beam is recirculated through a birefringent medium and looped back to be recombined with the input light. This allows a weighted averaging of the different polarization states that result from birefringence in the recirculation path of the recirculated beam. The depolarizer is formed from single mode fiber optic cables and fused single mode fiber couplers. Each fiber coupler has an input pair of fibers and an output pair of fibers. One of the output fibers is coupled to one of the input fibers to form a recirculation loop. Additionally, polarization controllers provided in the input fiber and recirculation loop allow the degree of polarization of the output beam to be varied across a wide spectrum of values.

3 Claims, 10 Drawing Sheets

OPTICAL RECIRCULATION DEPOLARIZER AND METHOD OF DEPOLARIZING LIGHT

This is a divisional application of U.S. Ser. No. 09/366,158, now U.S. Pat No. 6,205,262, which is a divisional application of U.S. Ser. No. 08/847,177 filed May 1, 1997, now U.S. Pat. No. 5,933,555.

BACKGROUND

1. Field of the Invention

The present invention relates to the field of optics in general. More particularly, the present invention relates to the field of depolarizers which have applications in communications, sensors, optical instruments and other areas.

2. Description of the Related Art

Many optical devices used in communications and instrumentation, such as switches, couplers and modulators, are highly sensitive to the state of polarization of light. The performance of communication systems and instruments which utilize such optical devices varies as the state of polarization (hereinafter SOP) varies. Fluctuations in the SOP can result in reduced signal to noise ratios in fiber optic communication systems or decreased sensitivity and accuracy in fiber optic instruments.

When light passes through a fiber optic cable (hereinafter fiber), the initial polarization of the light, whether polarized elliptically or linearly, can be changed due to varying environmental factors affecting the fiber. These environmental factors produce changes in the index of refraction of the fiber. Light propagating along the fiber will pass through these regions having differing indexes of refraction, thereby changing the initial SOP of the light as it propagates along the fiber. This effect of altering the SOP of light as it passes through a medium is called birefringence. The polarization received at the output end of the fiber may thus change radically from the initial SOP at the input end of the fiber. Because birefringence is affected by varying environmental factors, the output SOP will not have a predictable relation to the input SOP. Instruments and devices sensitive to SOP will therefore have their performance degraded in a manner which cannot easily be predicted or corrected.

One solution to the problem of birefringence is to replace common single mode fiber with polarization maintaining fiber (hereinafter PMF), which is not sensitive to environmental factors and therefore preserves the initial SOP as light propagates along the fiber. While PMF has advantages over standard single mode fiber, it is also very expensive to use. One meter of PMF costs approximately $10.00, roughly 100 times the cost of single mode fiber.

While single mode fiber has the drawback of birefringence, if the incident light propagating within the fiber is depolarized, then the birefringent effect will not alter the SOP. Depolarized light is the combination of light of all polarization states in equal proportion. Birefringence in single mode fiber alters all of the polarization states equally, thereby preserving the depolarization of light propagating along the fiber. Thus, if depolarized light is used, birefringence no longer produces a degradation in system performance.

One problem associated with utilizing depolarized light is that light sources used in fiber optic systems have a high degree of polarization (hereinafter DOP). The DOP is defined as the fraction of optical power that is polarized. To utilize polarized light sources, a depolarizer must be employed to remove the DOP. Currently available depolarizers have significant limitations which reduce their practical applicability in both fiber optic communication systems and fiber optic instrumentation.

One type of depolarizer is the electro-optic pseudo-depolarizer, which utilizes electrodes positioned on either side of a waveguide to change the refractive index within the waveguide. The varying refractive index in turn varies the SOP of the light passing through the waveguide. Although varying the refractive index of the waveguide varies the SOP, the measured effective DOP depends on detector speed. Over several cycles of varying the refractive index of the waveguide, the time-averaged output light appears depolarized in that no one SOP is preferred during the averaging time. This form of depolarization is called pseudo-depolarization or time-averaged depolarization, and has the disadvantage that light exiting the depolarizer within a narrow time interval has a high DOP. High speed detectors, however, detect light in a narrow time interval. Thus, a high speed detector would capture light with a high DOP when the light is time averaged over the narrow time interval. Additionally, the electro-optic pseudo-depolarizer is an active system requiring both driving circuitry and a power supply. Failure of any of these active components would result in the light exiting the waveguide with a high DOP. Another drawback of the electro-optic pseudo-depolarizer is its high cost. An electro-optic pseudo-depolarizer costs approximately $1000.00.

Another type of currently available depolarizer is the acoustic depolarizer. A driving speaker vibrates a segment of fiber within the depolarizer, thereby altering the index of refraction within the fiber as the fiber bends and vibrates. The index of refraction within the fiber varies at the frequency of the speaker. Polarized light passing through the vibrating fiber has its SOP altered at the frequency of the speaker. As with the electro-optic pseudo-depolarizer, the acoustic depolarizer depolarizes light on a time averaged basis. The DOP then varies at the frequency of the driving speaker. For detectors and instruments which detect polarization states at a time interval narrower than the time interval for depolarization, which is dependent on the frequency of the speaker, light exiting the acoustic depolarizer will have a noticeable DOP. Another disadvantage of the driving speaker depolarizer is that it is an active system which relies on the performance of the driving speaker. In addition to the costs associated with the driving speaker and associated circuitry, such a system is prone to failure if any of the many components of the speaker or driving circuitry fail. Thus, although the driving speaker depolarizer reduces the DOP, the output light still retains a significant DOP within a narrow time interval.

Another known depolarizer is the Lyot depolarizer. The Lyot depolarizer consists of two plates of quartz crystal having large retardances. The light source utilized with a Lyot depolarizer is a broad band source, for example a superluminescent diode. The crystals are arranged such that the incident light passes through the first crystal and into a second crystal adjacent to the first crystal. The ratio of thickness of the two crystals is 2:1. While the light exiting the second crystal is depolarized over a large wavelength region, light in a small wavelength region is not depolarized. Thus, the Lyot depolarizer is ineffective for depolarizing monochromatic or narrow wavelength light sources. Another drawback of the Lyot depolarizer is the high cost associated with using a broad band light source. Broad band light sources have the additional disadvantage of having lower output power than is possible with narrow band light sources. Another disadvantage of the Lyot depolarizer is its inapplicability with many fiber optic communication systems due to the use of a broad band light source. As a pulse of light from a broad band source propagates along the birefringent single mode fiber used in many communications systems, there is a time shift in the pulse caused by the different propagation speeds of the different wavelength components of the broad band light pulse. This time shift causes a "spreading" of the light pulse and is incompatible with the high data transmission rates of many fiber optic communication systems.

Still another type of currently available depolarizer is described in U.S. Pat. No. 5,486,916, issued to Michal et al., and in U.S. Pat. No. 5,457,756, issued to Hartl et al. This type of depolarizer is constructed from PMF. The ends of the PMF are oriented such that their principal axes are at an angle of 45°. In such a depolarizer the quality of the depolarizer depends critically on the 45° alignment of the PMF. As with the Lyot depolarizer, this type of depolarizer also requires a broad band light source. Thus, in addition to the high cost of the depolarizer dictated by the use of a broad band light source and the use of PMF, there are high fabrication costs associated with critically aligning and fusing the PMF. As with the time averaging pseudo depolarizers described above, this depolarizer spectrum averages and has the disadvantage in that it cannot be connected in series with other depolarizers of the same type. If it is connected in series with itself, as when two depolarizers are arranged such that the output of one depolarizer is input a second depolarizer, the output light from the second depolarizer has its DOP increased from the output of the first depolarizer. Thus, the depolarizer described in U.S. Pat. No. 5,486,916 is not suitable for producing very low DOP through series combination of the depolarizer.

Accordingly, it is desired that the present invention overcome the limitations of current optical depolarizers.

SUMMARY OF THE INVENTION

The present invention provides an optical depolarizer and method of depolarizing light, wherein light is depolarized by splitting the beam into an output beam and a recirculation beam. The recirculation beam propagates along a birefringent path and is then recombined with the input beam before the input beam is split into the output beam and recirculation beam. The combined input beam and recirculation beam is then split into an output beam and a recirculation beam. This process of splitting, recirculating along a birefringent path and recombining with the input beam averages beams with different states of polarization such that the output beam is the average of many light beams with differing states of polarization.

In one embodiment of the present invention a birefringent element is used with a plurality of mirrors. The input light beam is split into two beams by a partially reflecting mirror. One beam forms the output beam of the depolarizer. The other beam is reflected by mirrors through a birefringent element and back to the partially reflecting mirror. This part of the beam passing through the birefringent element forms the recirculation loop. Part of this beam striking the partially reflecting mirror is passed through as part of the output beam of the depolarizer. The other part is reflected along the path of the recirculation loop.

In one embodiment of the present invention the recirculation segment is used where the recirculating beam is reflected back along the path of the input beam and through a birefringent element along the input beam. The recirculating beam is then reflected back along the path of the input beam in the direction of the input beam.

In one embodiment of the present invention a 2×2 fiber coupler is used where one input fiber and one output fiber are connected to form a recirculation loop.

In one embodiment of the present invention polarization controllers are included within the input fiber and recirculation loop to allow the degree of polarization to be tuned within a wide range of values.

In another embodiment of the present invention multiple single-ring depolarizers of either the standard type or the tunable type are connected is series such that the light output one single-ring depolarizer is input the next single-ring depolarizer.

In another embodiment of the present invention multiple 2×2 fiber couplers are connected in a non-series arrangement to allow recirculation and recombination of the light, thereby averaging different polarization states and depolarizing the output light beam.

In another embodiment of the present invention a recirculation depolarizer is formed from a single fiber coupled with itself to form a recirculation loop.

In another embodiment of the present invention a recirculation depolarizer is formed as an integrated optical device on a substrate. Waveguides direct the input light beam along the recirculating path to depolarize the input light beam.

DETAILED DESCRIPTION OF THE INVENTION

The present invention provides a method and apparatus for depolarizing light. In the following description, numerous details are set forth in order to enable a thorough understanding of the present invention. However, it will be understood by those of ordinary skill in the art that these specific details are not required in order to practice the invention. Well-known elements, devices, process steps and the like are not set forth in detail in order to avoid obscuring the present invention. Further, all patents, technical papers and other references referred to herein are incorporated by reference herein.

Figure 1:
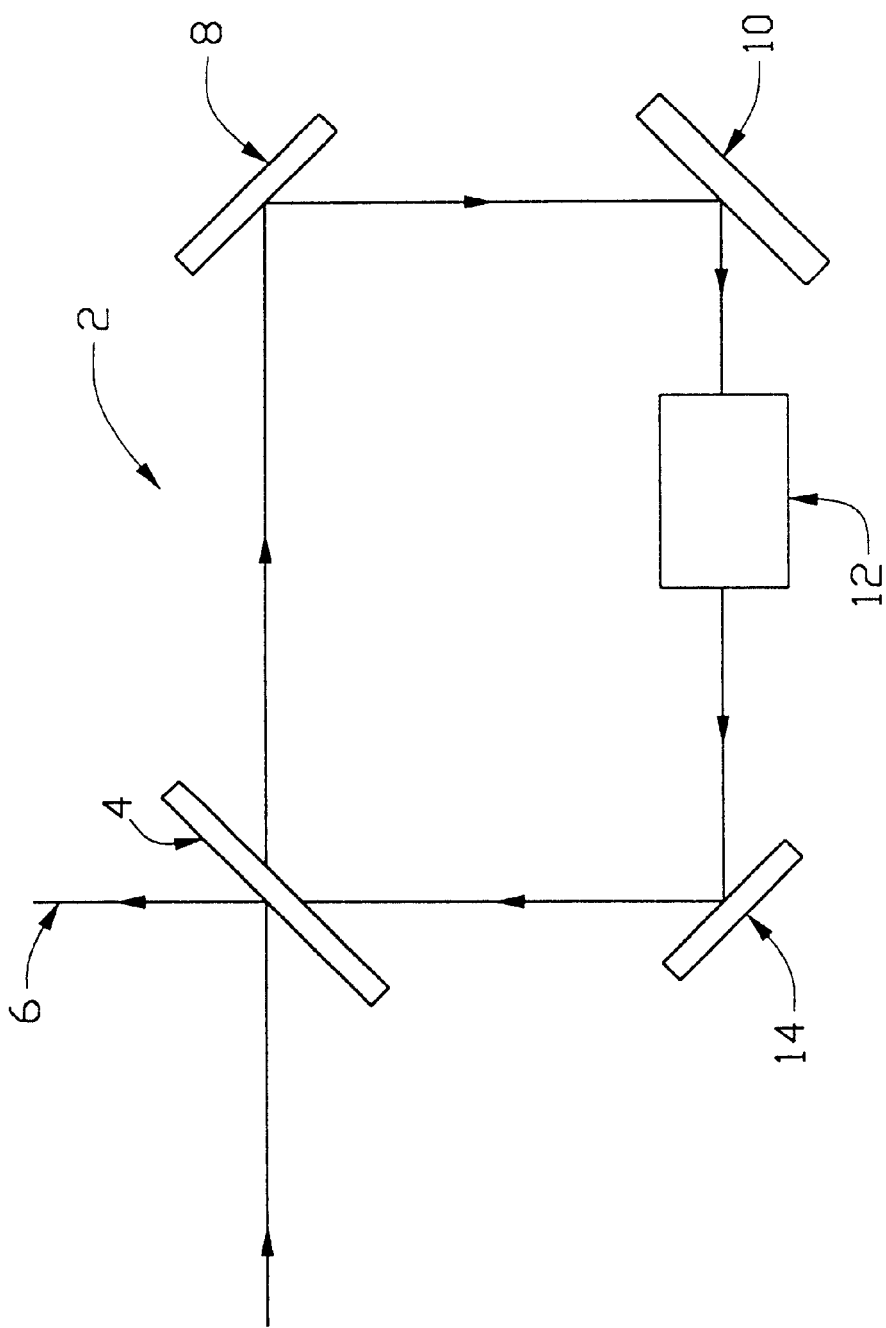
FIG. 1 is a diagram of a free space recirculating depolarizer with a recirculation loop in accordance with the present invention.

FIG. 1 is a diagram showing a free space depolarizer (2). Light from a light source, not shown, is input to a partially reflecting mirror (4). One part of the input beam is reflected from the partially reflecting mirror (4) and forms the output beam (6). The arrows along the path of the beam indicate the direction of propagation. The other part of the input beam passes through the partially reflecting mirror (4) to a mirror (8). The beam passing through the partially reflecting mirror (4) to the mirror (8) is referred to as the recirculation beam. The mirror (8) reflects the recirculation beam to a mirror (10). The recirculation beam reflected off the mirror (10) then passes through a birefringent element (12) and is reflected off a mirror (14). The birefringent element (12) can be formed from any translucent material which alters the SOP of a beam of light passing though it. After reflecting off the mirror (14), the recirculation beam returns to the partially reflecting mirror (4). As before, the light beam intercepting the partially reflecting mirrors is split into two beams. One beam passes through the partially reflecting mirror (4) and becomes part of the output beam (6) of the depolarizer (2). The other part of the recirculating beam is reflected by the partially reflecting mirror (4) to become part of recirculation beam.

In this manner, light input to the depolarizer (2) has a portion of the beam passing through the birefringent element. The output beam of the depolarizer (2) is then a combination of the input beam and the recirculation beams. The recirculation beam is continually split by the partially reflecting mirror (4), such that part of the recirculation continually beam passes through the birefringent element. Each time light passes through the birefringent element the SOP of the beam changes. Thus, the output beam, as the combination of many beams of differing SOP, no longer has a high DOP associated with the SOP of the input light. From the addition of many recirculation beams with different SOP, the resulting output beam has a low DOP.

The partially reflective mirror (4) can be chosen to allow any portion of the energy of the input beam to propagate along as the recirculation beam. Possible successful embodiments include a 50/50 split where the input beam is divided into two beams of equal intensity, as well as a 67/33 split, where the first number represents the percentage of light entering the recirculation beam and the second number represents the percentage of light entering the output beam. A low DOP has been shown with a 67/33 split, where 67% of the light reaching the beam splitter is propagated along the recirculation loop.

While the embodiment shown in FIG. 1 utilized four mirrors and one birefringent element, other embodiments could have several birefringent elements and a different arrangement of mirrors. Any arrangement of mirrors and birefringent elements that allows the recirculation and recombination of part of the input beam through a birefringent media would allow depolarization of the input light in accordance with the present invention.

Figure 2:
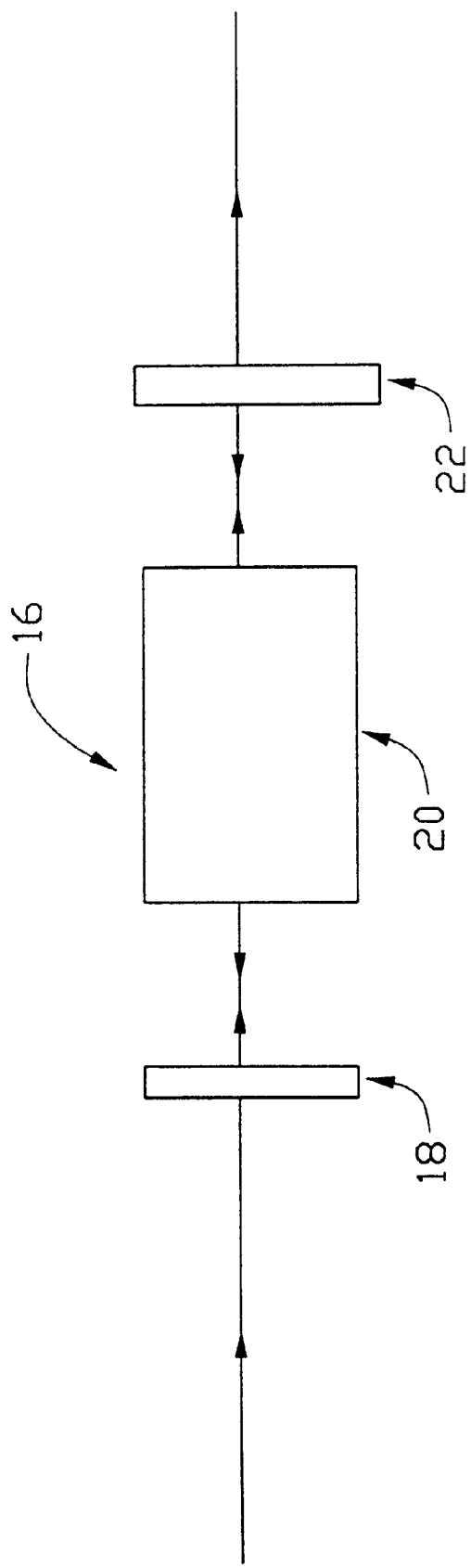
FIG. 2 is a diagram of a free space recirculating depolarizer with a recirculation segment in accordance with the present invention.

FIG. 2 shows a diagram of a free space depolarizer (16) wherein the recirculation path is a linear segment. Light from a light source, not shown, is input to a two-way mirror (18), which allows the input beam to pass through in the direction of propagation of the input beam. After passing through the two-way mirror (18), the input beam passes through a birefringent element (20) which alters the SOP of the input beam. After passing through the birefringent element (20), the input beam strikes a partially reflective mirror (22). The partially reflective mirror (22) splits the input beam into two beams. One part of the input beam passes through the partially reflective mirror (22) and becomes the output beam of the depolarizer (16). The other part of the input beam is reflected back from the partially reflective mirror (22) as the recirculation beam. The recirculation beam then backtraces the path of the input beam, first passing through the birefringent element (20), and then striking the two-way mirror (18). By backtracing it is meant that the recirculation beam reflected from the partially reflecting mirror (22) travels back in the direction of the two-way mirror (18). The recirculation beam need not retrace the exact path of the beam. After striking the two-way mirror (18), the recirculation beam is then reflected back from the two-way mirror (18), through the birefringent element (20), to strike the partially reflective mirror (22). As before, the recirculation beam is continually reflected between the mirrors. In the depolarizer (16) the path between the two-way mirror (18) and the partially reflective mirror (22), including the birefringent element (20), is the recirculation path of the depolarizer. Because the recirculation path of this depolarizer follows the path of the input beam, rather than a separate recirculation loop as in the depolarizer (2) shown in FIG. 1, the recirculation path is referred to as a recirculation segment.

A polarized input light beam entering the depolarizer (16) will have its DOP reduced in the following manner. As the input beam passes through the depolarizer (16) along the recirculation segment, the SOP of the input beam will be altered due to the birefringence of the recirculation segment, but the DOP will remain the same. The recirculation beams which traverse back along the recirculation segment will have their SOP varied from the SOP of the input beam due to the birefringence of the recirculation segment. After the recirculation beam is reflected back from the two-way mirror (18), the input beam propagating through the two-way mirror, and the recirculation beam reflected from the two-way mirror, combine to form a beam of decreased DOP, as the combination of two beams with different SOP. When the combined beam strikes the partially reflecting mirror (22), the reflected beam returns along the recirculation segment and is reflected by the two-way mirror (18). The combined beam has a lower DOP than the input beam. The part of the combined beam passing through the partially reflective mirror (22) has a lower DOP with each successive addition of a recirculation beam.

Although the above embodiments show a depolarizer with a birefringent element separate from the mirrors of the depolarizer, other embodiments could have the birefringent element as part of the mirror or mirrors of the depolarizer.

While the embodiment shown in FIG. 2 uses separate mirrors and a separate birefringent element, one way of constructing such a depolarizer includes using a single fiber which has been grated. A section of the fiber is grated to produce a first grating which allows the input beam traveling along the fiber to pass through. Further along the fiber in the direction of propagation of the input beam a second grated section is formed. This second grated section reflects a portion of the beam striking it, while allowing a portion of the beam to pass through. The segment of fiber between the first grating section and the second grating section acts as a birefringent element to alter the SOP of light which propagates along it. The first grated section, the second grated section and the segment of fiber between the grated sections form the recirculation segment. The input beam of the fiber passes through the first grated section to the second grated section. The input beam reflected back from the second grated section along the fiber to the first grated section, where the light is reflected again. When the light is reflected back from the first grated section it is combined with the input beam traveling along the fiber. A portion of this combined beam passes through the second grated section and forms the output beam of the depolarizer. As before, a portion of the combined beam is reflected back from the second grated section to the first grated section, thereby repeating the process of splitting and recombining with the input beam. The combining of beams with different SOP reduces the DOP of the output beam.

Figure 3:
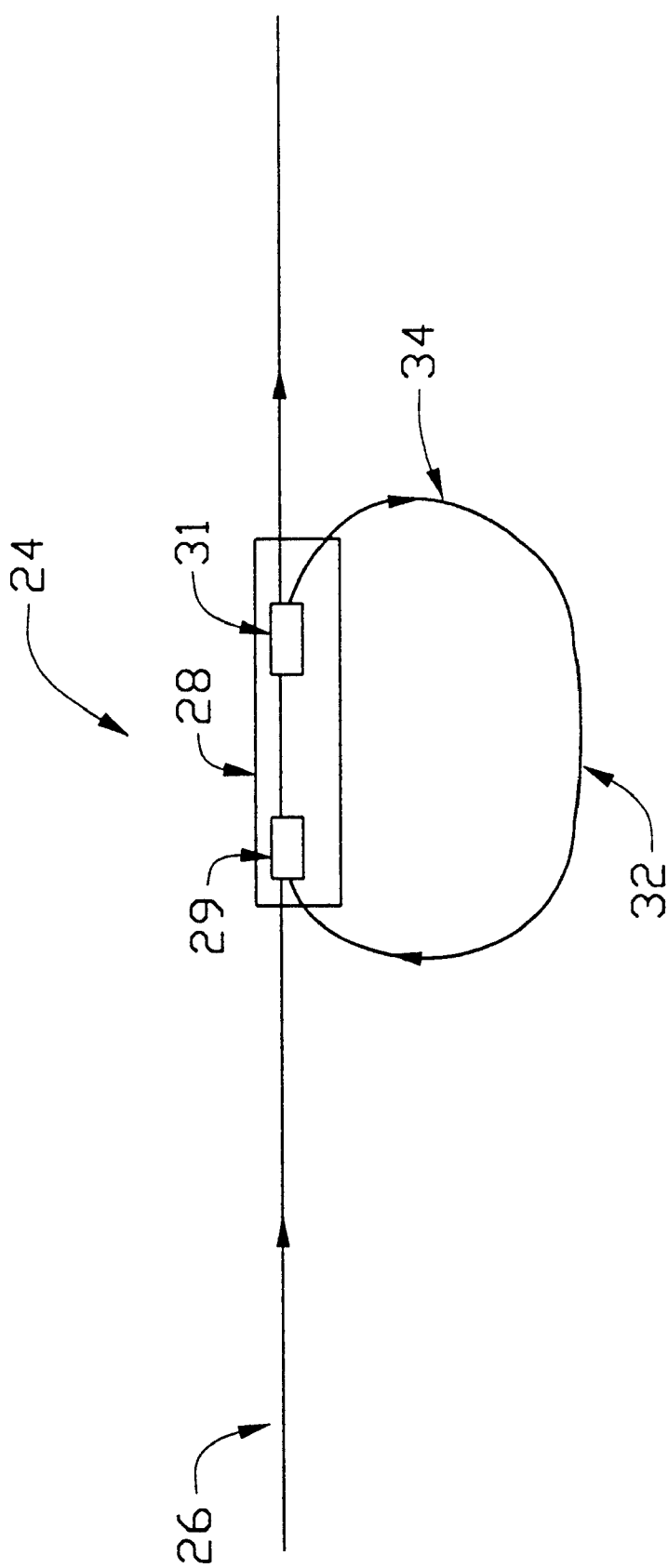
FIG. 3 is a diagram of a single-ring fiber optic recirculating depolarizer in accordance with the present invention.

FIG. 3 is a diagram showing a single-ring recirculating depolarizer (24) constructed from a standard 2×2 fiber coupler (28) which are available from Gould and AMP. A 2×2 fiber coupler acts both as a standard Y coupler (29) and as a beam splitter (31). Light beams entering the fiber coupler through its two input fibers are combined by a standard optical coupler to form a combined beam. The combined beam then propagates along fiber within the fiber coupler to the beam splitter of the fiber coupler. The beam splitter divides the combined beam into two beams. These two beams exit the fiber coupler through its two output fibers.

In the diagram of the depolarizer (24) shown in FIG. 3, light from a light source, not shown, is directed into the input fiber (26) of the 2×2 fiber coupler (28). The light source can be any coherent light source, such as a laser diode. One of the two beams split from the input beam exits the fiber coupler (28) through the output fiber (30). This exiting beam will hereafter be referred to as the output beam. The other split beam exits the fiber coupler (28) though the fiber (34) which forms part of the recirculation loop (32). The recirculation loop (32) may be formed by coupling one of the output fibers of the fiber coupler to one of the input fibers.

Thus, light entering the depolarizer (24) is sent along the input fiber (26) to the fiber coupler (28) where the input beam is split by the beam splitter into two beams. One of the split beams is sent along the output fiber (30) and the other split beam is sent along the recirculation loop (32). The beam sent on the recirculation loop (32), which will be referred to as the recirculation beam, is then recombined with the input beam within the fiber coupler (28). This combined beam of light formed from combining the input beam and the recirculation beam is then split by the splitter within the fiber coupler into two beams, as before, one of which is sent along the output fiber (30) and one of which is sent along the recirculation loop (32). Thus, light from the input beam is divided, recirculated, combined with the input beam, divided, recirculated, recombined with the input beam, and so on.

When considering the effect on the SOP of the output beam (30) due to the recirculation and recombination of the input beam (26), the following occurs. Light passing through a fiber experiences birefringence, i.e. the SOP changes as the light propagates along the fiber. Thus, the initial SOP is altered each time light passes through a fiber. In the depolarizer shown in FIG. 3 the initial SOP of the input beam (26) is altered as the beam passes through the fiber coupler (28) and as the beam passes along both the recirculation loop and the fiber of the output beam (30). While the initial output beam (the output beam before recirculation beams are combined with the input beam) will have a different SOP than the input beam, the degree of polarization (DOP) is the same. Each of the input and output beams has equal DOP but a different orientation, or SOP. As the recirculation beam (32) is recombined with the input beam (26), the SOP of the light of the recirculation beam is different than the SOP of the input beam due to the birefringence inherent in the fiber coupler (28) and the recirculation loop (32). Even as the birefringent effect changes with changing environmental factors, the SOP of the recirculation beam will continue to be altered from the SOP of the input beam.

Thus, the combined beam, formed from coupling the input beam and the recirculation beam within the fiber coupler, will no longer be polarized in one particular direction, but will be the combination of two beams with different polarization states. As explained above, this combined beam is split into two beams by the beam splitter within the fiber coupler (28). This new output beam, being the combination of the input beam and the recirculation beam, will then have not only a different SOP than the input beam but, as the combination of beams of different SOP, will also have a different DOP since this new output beam will no longer be polarized in one SOP. Similarly, the recirculation beam resulting from the splitting of the combined input beam and recirculation beam will also not have the high DOP of the initial input beam.

This process is repeated continually as the beam within the depolarizer is continually split, sent along the recirculation loop, recombined with the input beam, and input into the beam splitter. The net result of each split, recirculation and recombination is that the output beam is the combination of many beams of differing SOP and DOP, thereby reducing the degree of polarization of the output beam with each recombination.

If the recirculation loop is longer than the coherence length of the light of the input beam, then the input beam will not be coherent with the recirculation beam. The coherence length of a light source is a well known quantity and is proportional to the inverse of the spectral length. When two beams that are not coherent to each other are combined, they do not substantially interfere with each other. For a standard laser diode with a wavelength of 1300 nm and a spectral length of 0.1 nm, the coherence length is approximately 1.67 cm. Thus, as long as the recirculation loop is longer than 1.67 cm, the interferometric effects of combining the input beam and the recirculating beam will be negligible. As n, the number of recirculations, approaches infinity, i.e. when the depolarizer has been connected to the light source for more than a few nanoseconds, the intensity of the light approaches the intensity of the input beam, assuming no internal or splicing losses.

Figure 4:
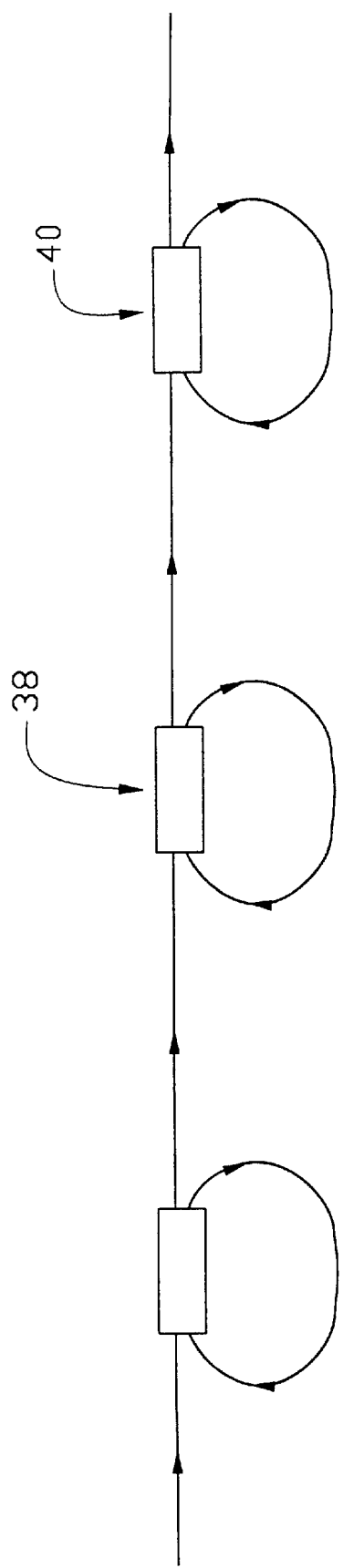
FIG. 4 is diagram of three single-ring fiber optic recirculating depolarizers as shown in FIG. 3 connected in series in accordance with the present invention.

FIG. 4 is a diagram illustrating three single-ring recirculating depolarizers of FIG. 3 connected in series such that the output from a first depolarizer (36) is the input of a second depolarizer (38) and the output of the second depolarizer (38) is the input of a third depolarizer (40). The intensity of the output beam (42) is equal to the intensity of the input beam, assuming no internal losses or splicing losses. Thus, even with three single-ring depolarizers connected in series, the output beam has the same intensity as the input beam.

The embodiments shown in FIGS. 1 and 2, including the fiber grating embodiment of the depolarizer of FIG. 2, may also be connected in series as shown in FIG. 4.

Figure 5:
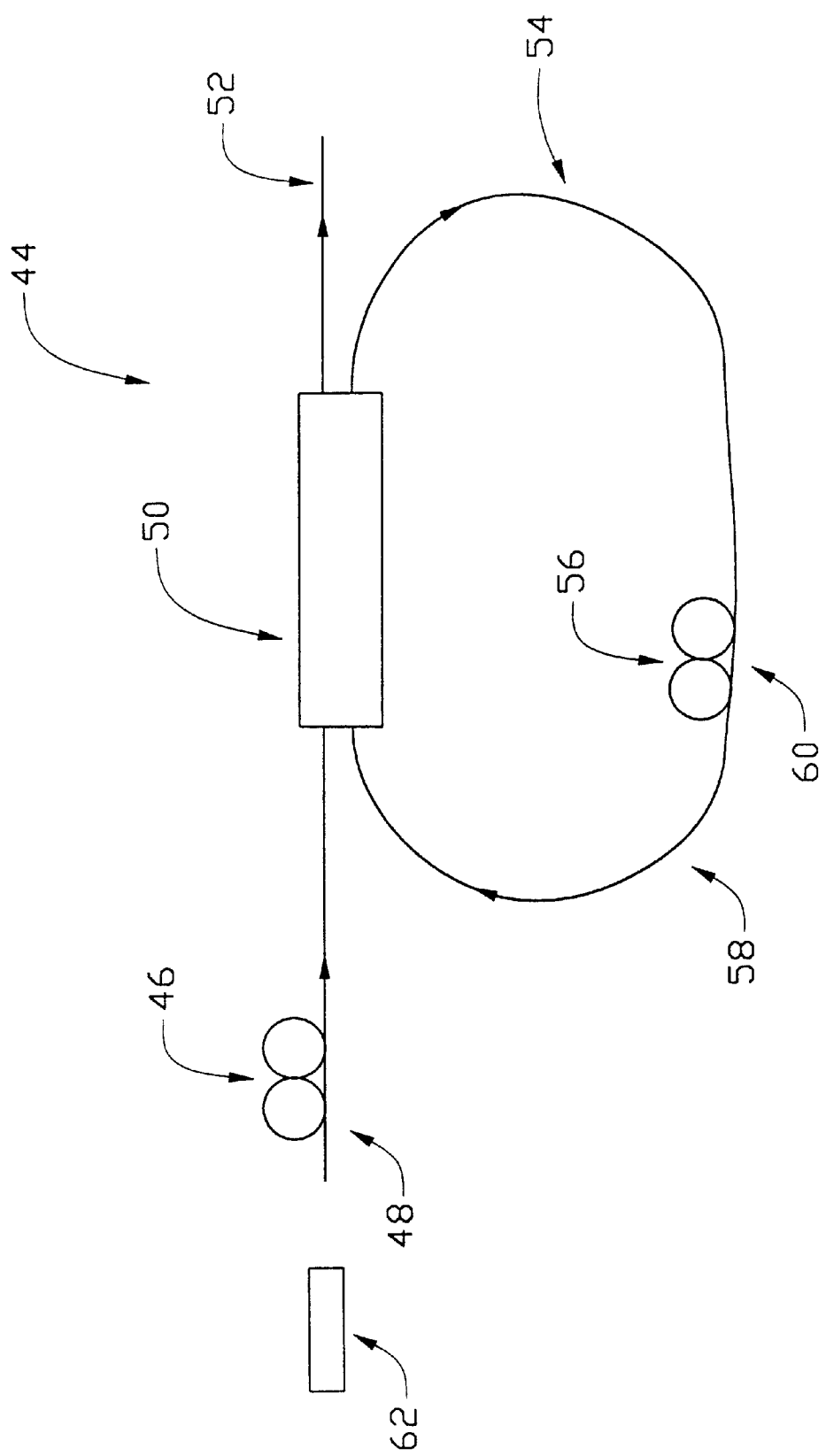
FIG. 5 is a diagram of a single-ring tunable fiber optic recirculating depolarizer in accordance with the present invention.

FIG. 5 shows a tunable single-ring depolarizer (44), where a polarization controller (46) is included in the input fiber (48). The polarization controller (46) is adjustable to control the polarization of the input beam within the input fiber (48). Light from the input fiber (48) that passes through the polarization controller (46) is input to the 2×2 fiber coupler (50). The fiber coupler (50) splits the input beam from the input fiber (48) into two beams, which exit the fiber coupler (50) through fibers (52) and (54). Fiber (52) carries the output beam and fiber (54) connects to a polarization controller (56). Polarization controller (56) is also connected to the input fiber (58) of the fiber coupler (50). In this manner the polarization controller (56) and fibers (54) and (58) form the recirculation loop (60) of the tunable single-ring depolarizer (44). After passing through the recirculation loop (60), light exiting the fiber coupler (50) through fiber (54) is recombined with the input beam from fiber (48) by the fiber coupler (50).

By adjusting both the polarization of the input beam by the polarization controller (46) and the polarization of the recirculation beam by the polarization controller (56), the DOP of the output beam can be tuned to significantly lower DOP than was realizable with the single-ring depolarizer (24) shown in FIG. 3. The tunable single-ring depolarizer (44) of FIG. 5 has been found to depolarize light to as low as 1.15%. Significantly, the tunable single-ring depolarizer (44) may be adjusted to provide an output beam with a 99.8% polarization. Thus, the tunable single-ring depolarizer is able not only to provide a highly depolarized light, but can also be tuned such that it provides nearly perfectly polarized light. This gives the tunable single-ring recirculation depolarizer great flexibility in applications were the DOP of the light would need to be varied or specifically tuned to a particular DOP.

Figure 6:
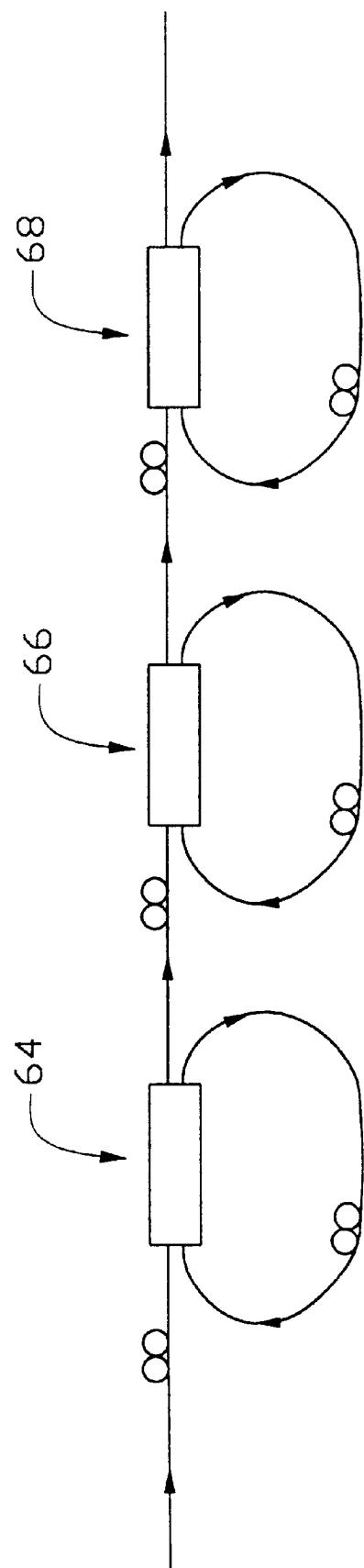
FIG. 6 is a diagram of three tunable single-ring fiber optic recirculating depolarizers as shown in FIG. 5 connected in series in accordance with the present invention.

FIG. 6 illustrates three tunable single-ring depolarizers of FIG. 5 connected in series. The output of one tunable single-ring depolarizer is connected to the input of the next tunable single-ring depolarizer. Each tunable single-ring depolarizer (64), (66) and (68) is constructed in the same manner as the tunable single-ring depolarizer (44) shown in FIG. 5, which includes polarization controllers (46) and (56) inserted in the input fiber (48) and recirculation loop (60) of the depolarizer (44). By utilizing three tunable single-ring depolarizers connected in series, the degree of polarization of the light output from the third tunable single-ring depolarizer has been reduced as low as −20 dB.

Several possible types of polarization controllers could be utilized with the depolarizer (44). One possible depolarizer is described in U.S. Pat. No. 4,389,090 issued to H. C. LeFevre, which is incorporated by reference herein. This type of polarization controller utilizes two metal plates to twist two coils of fiber, thereby inducing birefringence to change, and thereby control, the polarization of light output from the polarization controller. Other possible polarization controllers include liquid crystal polarization controllers and integrated optics polarization controllers.

Figure 7:
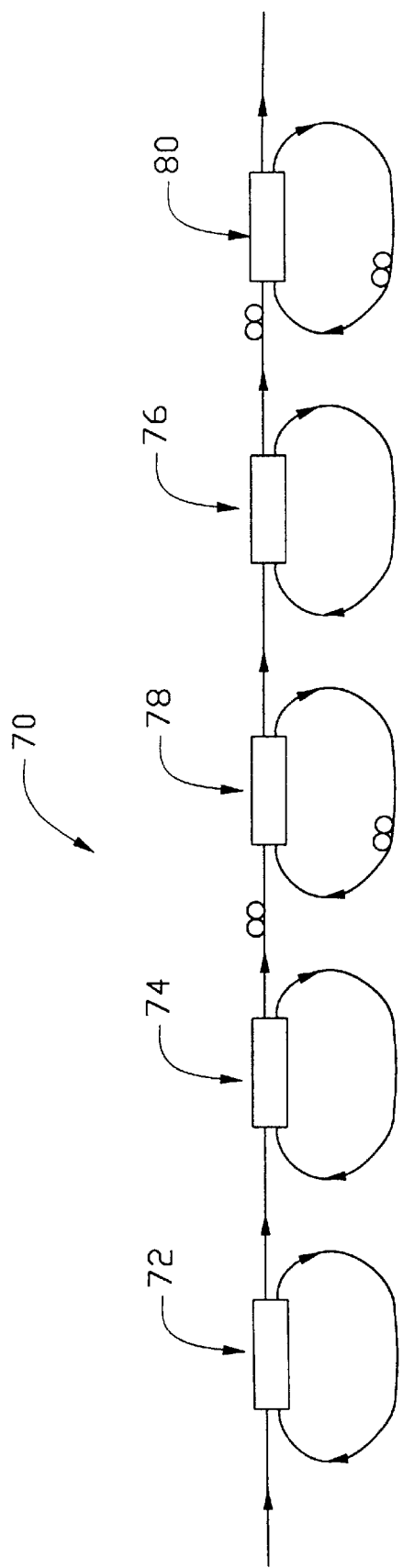
FIG. 7 is a diagram of three single-ring fiber optic recirculating depolarizers as shown in FIG. 3 connected in series with two tunable single-ring fiber optic recirculating depolarizers as shown in FIG. 5 in accordance with the present invention.

While the embodiments of multiple single-ring depolarizers shown in FIG. 4 and FIG. 6 are constructed from either the single-ring depolarizer (24) shown in FIG. 3 or the tunable single-ring depolarizer (44) shown in FIG. 5, other embodiments of the present invention could combine depolarizers of the type (24) shown in FIG. 3 with tunable depolarizers (44) of the type shown in FIG. 5. Additionally, other embodiments of the present invention could combine more or fewer single-ring depolarizers of either type, or both types, in any order. As one possible example of this, the depolarizer (70) shown in FIG. 7 is constructed from three single-ring depolarizers (72), (74) and (76) of the type shown in FIG. 3 and two tunable single-ring depolarizers (78) and (80) of the type shown in FIG. 5. In the embodiment shown in FIG. 7, the tunable single-ring depolarizers (78) and (80) occupy the third and fifth positions in the order of depolarizers along the path of propagation of the light beam through the fiber from left to right.

While the above multiple single-ring depolarizers connected single-ring depolarizers in series, other embodiments of the present invention could connect recirculating depolarizers in different configurations.

Figure 8:
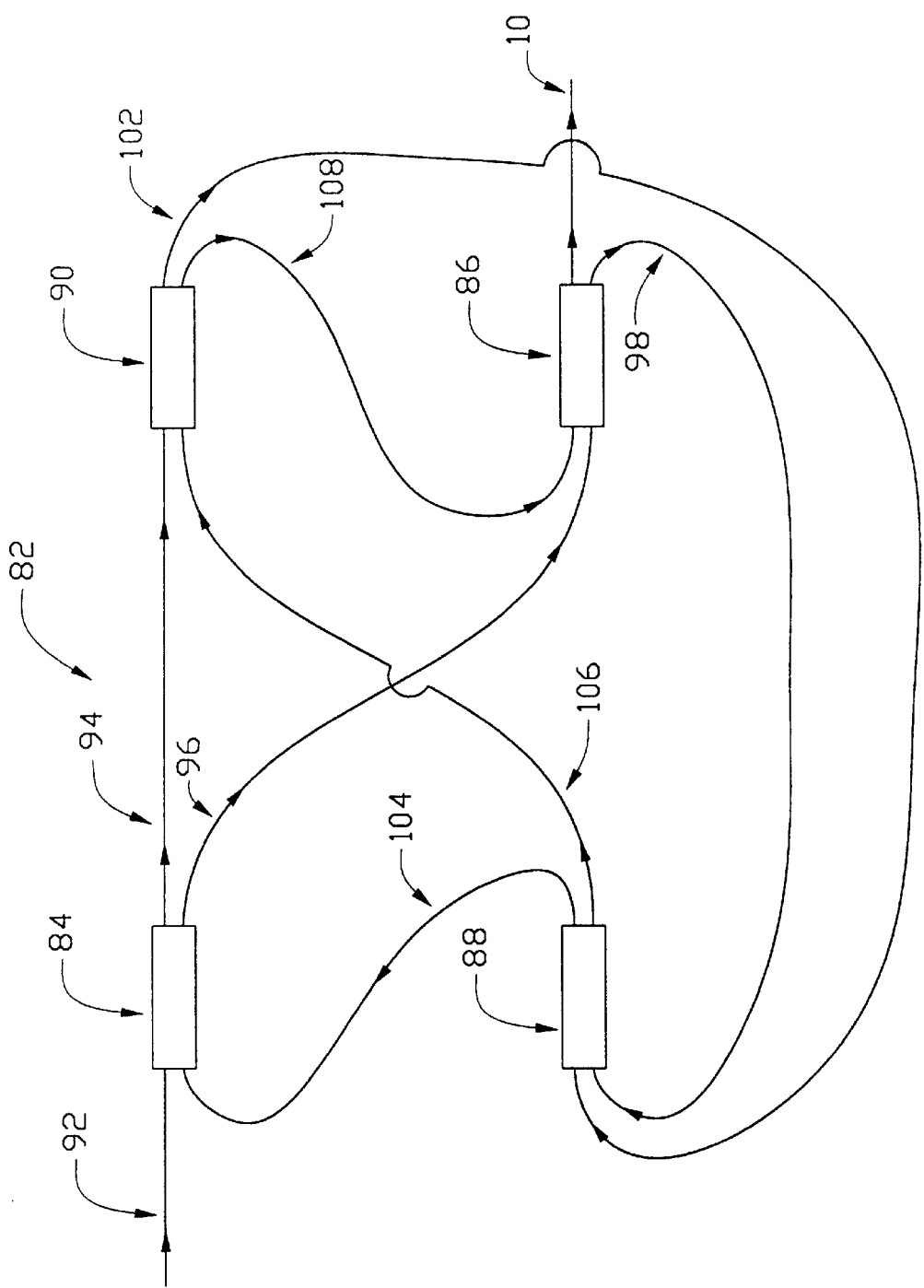
FIG. 8 is a diagram of a multiple splitter recombination fiber optic depolarizer in accordance with the present invention.

Specifically, FIG. 8 is a diagram illustrating a multiple splitter recombination depolarizer (82) constructed from four 2×2 fiber couplers (84), (86), (88) and (90). Light is input to the fiber coupler (84) through input fiber (92). The fiber coupler (84) splits the beam from the input fiber into two beams. The two beams exiting the fiber coupler (84) are connected to the fibers (94) and (96). Fiber (94) is input fiber coupler (90) and fiber (96) is input fiber coupler (86). Fiber coupler (86) recombines beams of light from fibers (108) and (96) and then splits the recombined beam into two beams. These two beams exit fiber coupler (86) through exit fibers (98) and (100). Fiber (98) connects to the input of fiber coupler (88). Fiber (100) serves as the output fiber of the depolarizer (82). The output beam (98) from fiber coupler (86) is combined by the fiber coupler (88) with the beam connected from the fiber (102). Fiber coupler (88) splits the combined beam from fibers (98) and (102) into two beams. These two beams exit fiber coupler (88) through fibers (104) and (106). Fiber (104) is input fiber coupler (84), fiber (106) is input fiber coupler (90). Fiber coupler (90) combines the beams of light from fibers (94) and (106) and then splits the combined beam into two beams. These two beams exit fiber coupler (90) through fibers (102) and (108). Fiber (108) connects to fiber coupler (86) and fiber (102) connects to fiber coupler (88). Fiber coupler (84) combines the beam from fiber (104) with the beam from input fiber (92). Fiber coupler (84) then splits the combined beam into two beams which exit through fibers (94) and (96).

Polarized light entering the depolarizer (82) through input fiber (92) is repeatedly split and recombined with recirculated light beams as the split and recombined beams circulate through the four fiber couplers (84), (86), (88) and (90). In this manner the output beam (100), which is a combination of recirculated beams, is then the weighted average of the polarization states of all of the combined beams. Due to the birefringence of light traveling along the fibers between the fiber couplers, the result of the weighted averaging of the polarization states of the combined beams produces an output beam with a very low DOP.

While the embodiment shown in FIG. 8 utilizes four fiber couplers, other embodiments could utilize more or fewer fiber couplers arranged such that the light beam traveling through the depolarizer is repeatedly split, sent along different optical paths with different birefringent effects, and recombined to average the different polarization states, thereby depolarizing the output light beam. Additionally, other embodiments of the present invention may use polarization controllers or single-ring depolarizers with multiple fiber couplers connected in a non-series manner. The embodiment illustrated in FIG. 8 is provided to demonstrate the versatility of the present invention. As such, it is but one of many possible combinations in accordance with the present invention.

While the above embodiments shown in FIGS. 2–8 utilized a standard narrow band laser diode, the present invention can also utilize broad band light sources depending on the application. This flexibility of the present invention, to use either broad band light sources or narrow band light sources, with their lower cost and greater reliability, gives the present invention an advantage over currently available optical depolarizers.

While the above embodiments shown in FIGS. 2–8 utilize standard 2×2 fiber couplers due to their low cost and low internal loss, other embodiments of the present invention may utilize separate beam splitters and couplers to split and recombine the light beam. Other embodiments may utilize 3×3 or 4×4 or greater fiber couplers to allow larger numbers of recirculation loops. While the fiber couplers of FIGS. 3–4 incorporated a 50/50 beam splitter, this is used as an example only and other embodiments could utilize splitters with different splitting ratios. While the recirculation loops of the embodiments shown in FIGS. 3–4 are formed by splicing two fibers together, in other embodiments the recirculation loop could be formed from a single fiber.

Figure 9:
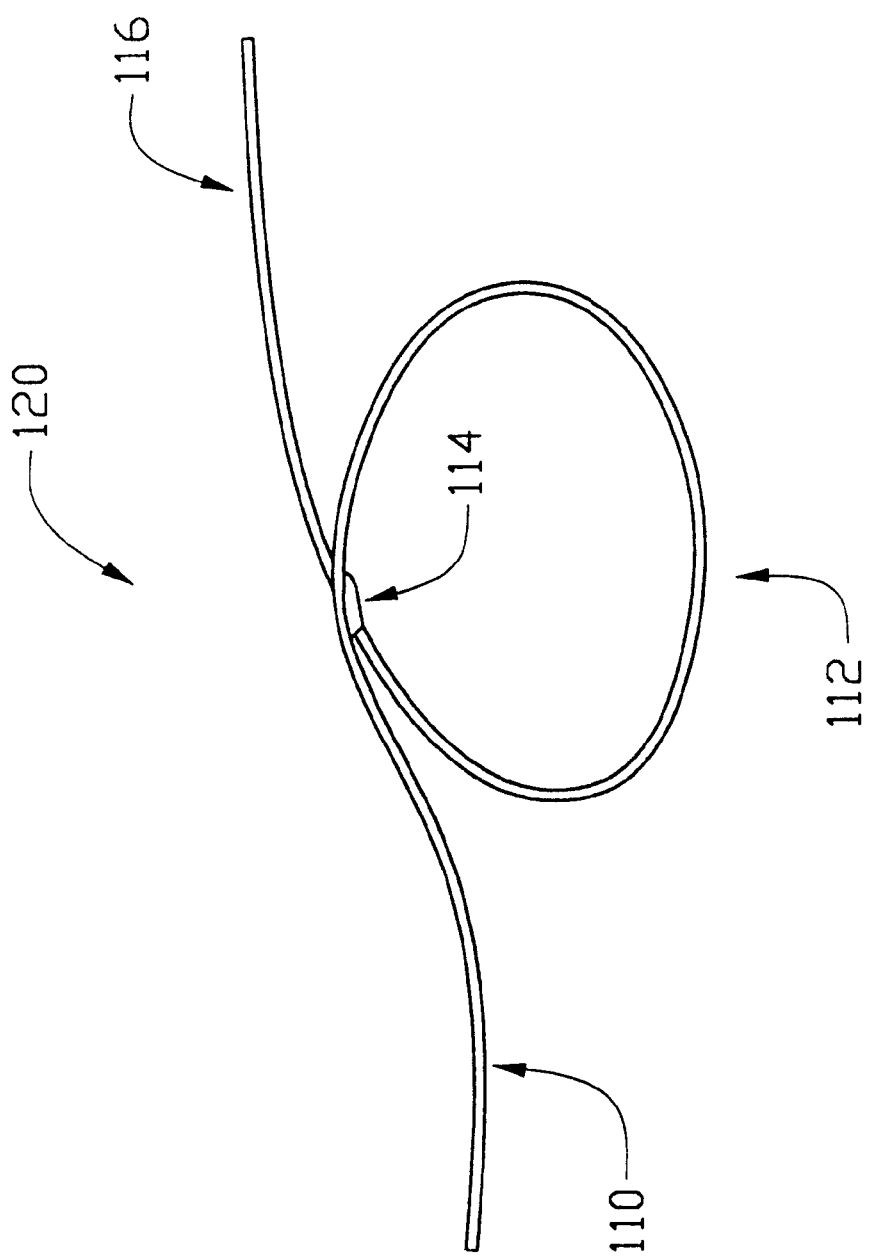
FIG. 9 shows a single ring depolarizer formed from a one piece of fiber looped to form a recirculation loop in accordance with the present invention.

FIG. 9 shows a single ring depolarizer (120) formed from a single piece of fiber (110) looped to form a recirculating loop (112). Light input the fiber (110), forming the input beam, propagates along the fiber and through the recirculation loop (112) to the coupling point (114) where the fiber (110) is coupled with itself. Light propagating along the recirculation loop (112) is split into two beams at the coupling point (114). The beam propagating along the recirculation loop (112) is referred to as the recirculation beam. One beam propagates along the output end (116) of the fiber to form the output beam of the depolarizer (120). The other beam propagates along the recirculation loop (112) of the fiber (110). The birefringence of the recirculating loop alters the SOP of recirculation beam from the SOP of the input beam. Combing the recirculation beam with the input beam at the coupling point (114) results in a lowering of the DOP of the output beam of the depolarizer (120).

The coupling of the fiber (110) with itself can be performed by merging the fibers together, typically after some of the fiber's cladding has been removed, to allow light to pass between the light carrying cores. Processes including heating, polishing or chemical merging may be employed to this end.

While the embodiments disclosed herein used single mode fiber, the present invention is not limited to single mode fiber and other embodiments could be constructed from other types of optical fiber. Additionally, several different types of optical fiber can be used in one depolarizer.

Additionally, while the present invention utilizes single mode fibers due to their low cost and availability, other embodiments of the present invention may utilize other types of fiber or other media to recirculate and transmit the beam path.

Figure 10:
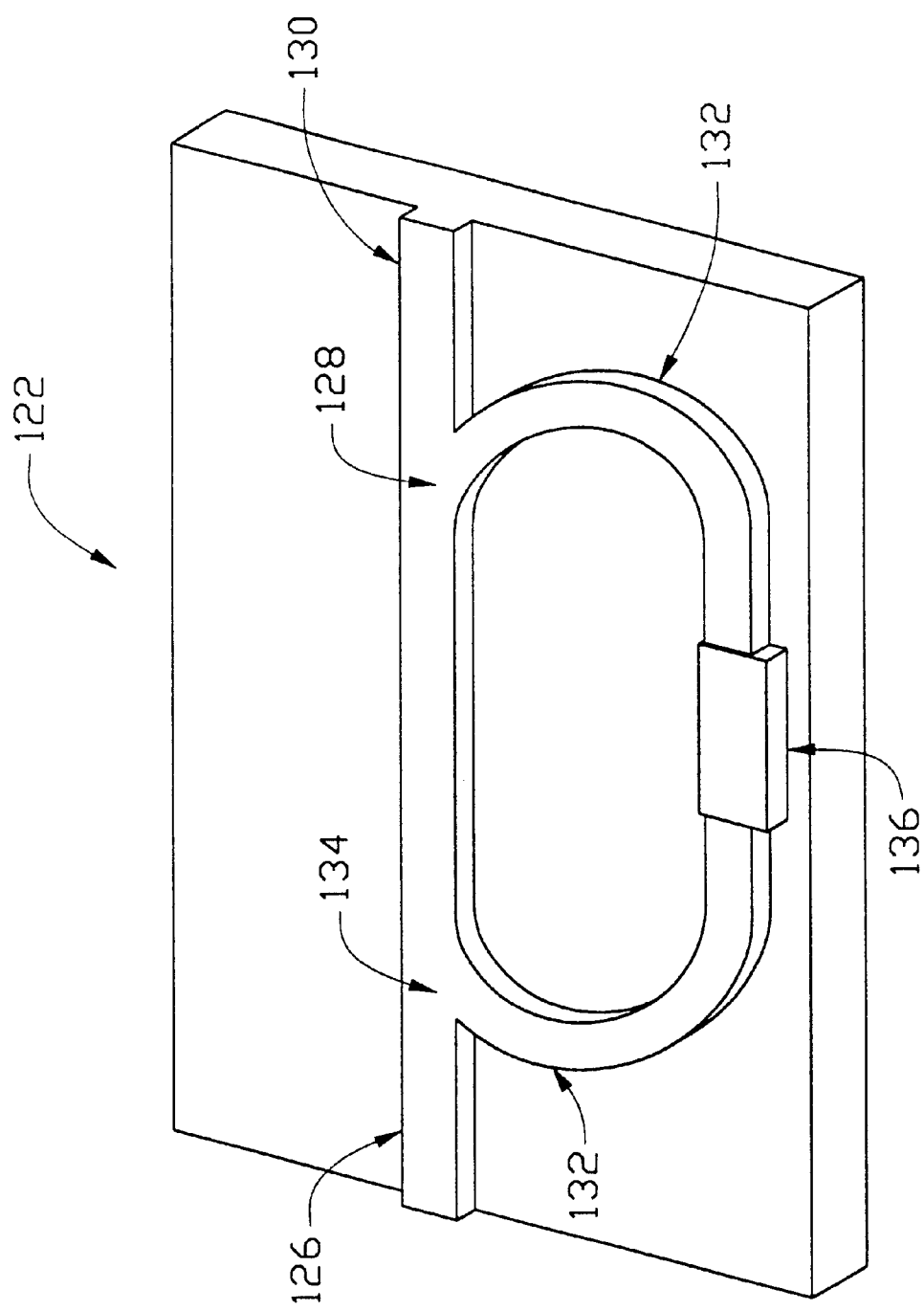
FIG. 10 shows a recirculating depolarizer formed as an integrated optical device in accordance with the present invention.

FIG. 10 shows a depolarizer (122) formed as part of an integrated optical chip (124). Several materials are available for waveguide formation, such as LiNbO$_3$ or plastics. Light from an input source, not shown, is directed into the input waveguide (126) and forms the input beam. The input beam propagates along the waveguide (126) to the point (128). At the point (128) the waveguide splits into a output waveguide (130) and a recirculation waveguide (132). The input beam is split into two beams when it reaches the point (128). One of the split beams propagates along the output waveguide (130) and forms the output beam of the depolarizer (122). The other split beam propagates along the recirculation waveguide (132) and forms the recirculation beam. A polarization controller (136) is included in the recirculating waveguide and alters the SOP of the recirculation beam. The recirculation beam is combined with the input beam at the point (134). The combined recirculating beam and input beam propagates to the point (128) where it is split into two beams, as described above. The output beam propagating along the output waveguide (130) is then formed from the combination of the input beam and the recirculation beam.

In this way a portion of the input beam is diverted along a recirculation path which, due to the polarization controller (136), alters the SOP of the light. When the recirculation beam is combined with the input beam, the DOP of the combined beam is lower than the DOP of the input beam. Each time the combined beam reaches the point (128), a portion of the combined beam is diverted along the recirculation waveguide (132). Each time the beam from the recirculation waveguide (132) is combined with the input beam, the DOP of the resulting combined beam is lowered due to the change in the SOP of the beam propagating along the recirculating waveguide. The resulting output beam of the depolarizer, as the combination of beams with different SOP, has a lower DOP than the input beam.

The polarization controller (136) can be of either an electric field or acoustic type. In the electric field or acoustic type polarization controller either an electromagnetic wave or an acoustic wave is used to change the index of refraction of a medium within the polarization controller, thereby altering the SOP of a beam of light passing thought the polarization controller.

While the embodiment shown in FIG. 10 utilizes a waveguides formed on a substrate, other embodiments could have waveguides which are formed in a substrate by etching and deposition methods or other processes. Practitioners of the art of integrated optics will appreciate the many materials and methods used in forming integrated optical devices which are applicable in forming an integrated optical depolarizer in accordance with the present invention. As such, the embodiment shown in FIG. 10 is given as a representative example and is not meant to be limiting on the materials or methods used in forming an integrated optical depolarizer.

While the embodiment shown in FIG. 10 has only one recirculation loop, other embodiments could have multiple recirculation loops and multiple polarization controllers. In an embodiment with multiple recirculation loops, such loops may be positioned on both sides on the input and output waveguides, as one loop is formed on one side in FIG. 10. In another possible arrangement, multiple loops could be positioned oil the same side of the input and output waveguides. Additionally, the depolarizer (122) of FIG. 10 can be connected in series with other depolarizers formed on the same substrate or on separate substrates.

While the above embodiments have assumed negligent splicing losses and internal losses for explanation purposes, as with all optic systems and devices, the actual losses of a depolarizer in accordance with the present invention will vary depending on the materials selected as well as the methods and quality of construction.

Although the invention has been described in conjunction with particular embodiments, it will be appreciated that various modifications and alterations may be made by those skilled in the art without departing from the spirit and scope of the invention. In particular, those skilled in the art will recognize that the present invention is not limited fiber optic communications and optical instruments.

What is claimed is:

1. An optical depolarizer, comprising:
    a birefringent element;
    a two-way mirror; and
    a partially reflecting mirror, wherein the birefringent element, two-way mirror and partially reflecting mirror form a recirculation segment.

2. An optical depolarizer formed from a segment of optical fiber, comprising:
    a first grating section;
    a second grating section; and
    a recirculating segment.

3. An optical depolarizer of claim 2,
    wherein a portion of the light propagating along the fiber is transmitted through the first grating section to the second grating section,
    wherein a portion of the light striking the second grated section is reflected back to the first grated section and a portion of the light striking the second grated section is transmitted through the second grated section,
    wherein a portion of the light striking the first grated section after being reflected back to the first grated section from the second grated section is reflected back toward the second grated section and thereby combined with light transmitted through the first grated section, and
    wherein the portion of the light transmitting through the second grated section forms an output beam of the depolarizer.

* * * * *